J. W. Chappell.
Hand Seeder.
Nº 32,975.
Patented Aug. 6, 1861.
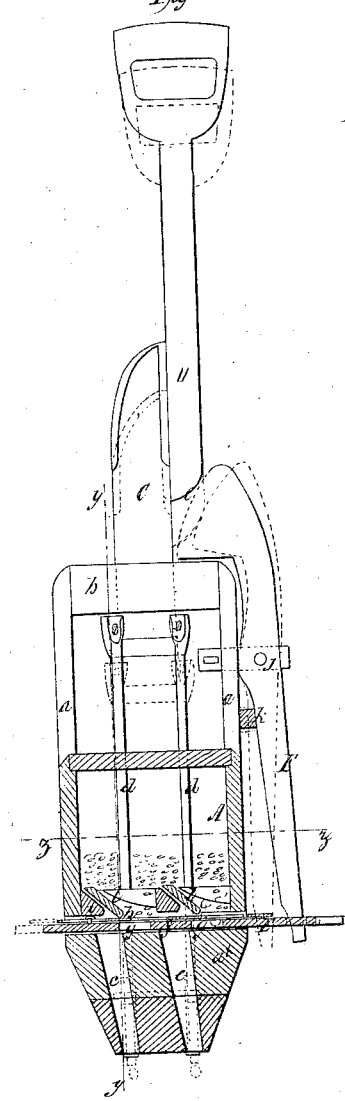
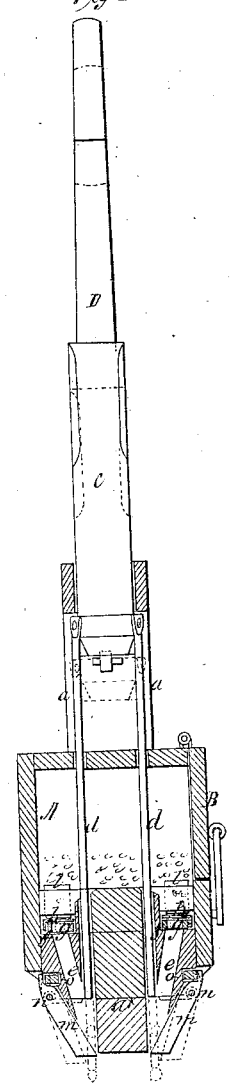
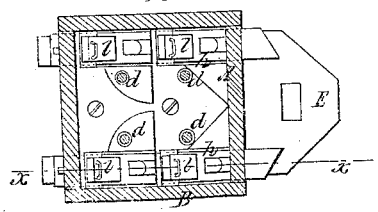
Witnesses:
Inventor
J. W. Chappell
per Munn & Co.
Attorneys

UNITED STATES PATENT OFFICE.

J. W. CHAPPELL, OF LOOMISVILLE, MICHIGAN.

IMPROVEMENT IN HAND CORN-PLANTERS.

Specification forming part of Letters Patent No. 32,975, dated August 6, 1861.

*To all whom it may concern:*

Be it known that I, J. W. CHAPPELL, of Loomisville, in the county of Kent and State of Michigan, have invented a new and Improved Hand Corn-Planter; and I do hereby declare that the following is a full, clear, and exact description of the same, reference being had to the annexed drawings, making a part of this specification, in which—

Figure 1 is a vertical section of my invention, taken in the line $x\ x$, Fig 3. Fig. 2 is a vertical section of the same, taken in the line $y\ y$, Fig. 1. Fig. 3 is a horizontal section of the same, taken in the line $z\ z$, Fig. 1.

Similar letters of reference indicate corresponding parts in the several figures.

The object of this invention is to obtain a hand corn-planter which will plant the kernels separately—that is to say, deposit the kernels in the hill at a proper distance apart, so that each will have a suitable space alotted to it for after growth and culture, and the kernels at the same time be planted at a suitable and uniform depth in the ground.

To enable those skilled in the art to fully understand and construct my invention, I will proceed to describe it.

A represents a box or hopper, which is provided at one side with seed, and to two opposite sides of the box or hopper A there are attached uprights $a\ a$, the upper ends of which are connected by a cross-piece, $b$, through which a bar, C, passes loosely, said bar having a handle, D, attached, the lower end of the handle being rounded, as shown at $c$.

To the lower end of the bar C there are attached four rods, $d\ d\ d\ d$, said rods being at equal distances apart at the angles of a square. (See Fig. 3.) The rods $d$ pass vertically through the bottom $a^*$ of the box or hopper A, and adjoin openings $e\ e\ e\ e$, which are made in said bottom for the discharge of the corn, the openings being slightly inclined, so that the rods $d$ will be in or pass through their lower ends, as shown clearly in Fig. 2.

E is a slide which passes transversely through the hopper A. This slide is forked or cut away at its inner part within the hopper, so as to form the prongs or slides $f\ f$, each of which has two holes, $g\ g$, made in it, the capacity of said holes being varied by means of slides $h$, which may be adjusted at any point by set-screws $i$. (See Fig. 1.) The outer end of slide E is connected to the lower end of a lever, F, which has its fulcrum $j$ at one side of the hopper or seed-box, and has a spring, $k$, bearing against it, the function of which is to push the slide E outward from the hopper.

At the bottom of the hopper, directly over the prongs or slides $f\ f$, there are placed two cut-offs, $l\ l$. These cut-offs are directly over the openings $e$.

In the outer side of the bottom $a^*$ there are fitted plates or bars $m$, a plate or bar being in line with each opening $e$. The plates or bars $m$ are fitted on rods $n$ in the bottom $a^*$, and are allowed to work freely thereon, and each bar $m$ has a spring, $o$, bearing against its upper end, said springs having a tendency to keep the lower ends of the bars $m$ in the lower parts of the openings $e$, so that the former may serve as stoppers to the latter. (See Fig. 2.)

The operation is as follows: The box or hopper A is supplied with a requisite quantity of corn, and when the lower end of the implement is over the spot where a hill of corn is to be planted the operator forces down the handle D, and the rods $d$ of course move down through the bottom $a^*$ and force out the corn from the openings $e$ into the ground, said corn being deposited in the openings $e$ in consequence of the lower rounded end, $c$, of the handle forcing out the upper end of lever F, the lower end of which shoves inward the slide E, and causing the filled hole $g$ to discharge their contents in the openings $e$ beneath the rods $d$. The corn is retained in said openings $e$, previous to the acttion of the rods $d$ upon it, by the plates or bars $m$. The rods $d$ force the corn into the ground at a uniform depth and at suitable distances apart, corresponding to the position of the rods $d$. When the handle D is drawn up, the spring $k$ of lever F forces out the slide E, so that the holes $g$ will be out from underneath the cut-offs $l\ l$, and be filled with seed, ready for a succeeding operation.

I do not claim, broadly and separately, the slide E, nor any other of the parts when separately considered; but I do claim as new and desire to secure by Letters Patent—

The combination of the rods $d$, box or hopper A, provided with a bottom, $a^*$, having inclined seed-passages $e$ and retaining-bars $m$, the slide E, lever F, and handle D, all arranged for joint operation, substantially as and for the purpose set forth.

J. W. CHAPPELL.

Witnesses:
WM. E. GROVE,
H. A. GILL.